April 6, 1965 M. C. TUCKER 3,176,897
PIPE WELDING TOOL CARRIAGE
Filed July 24, 1962 3 Sheets-Sheet 1
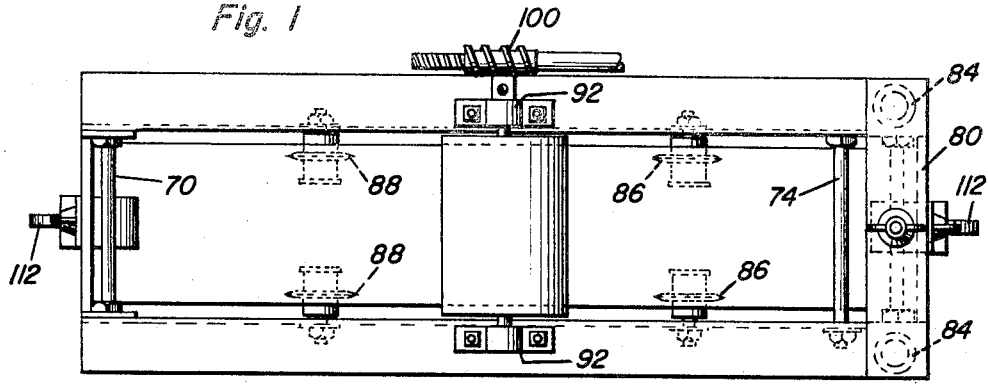
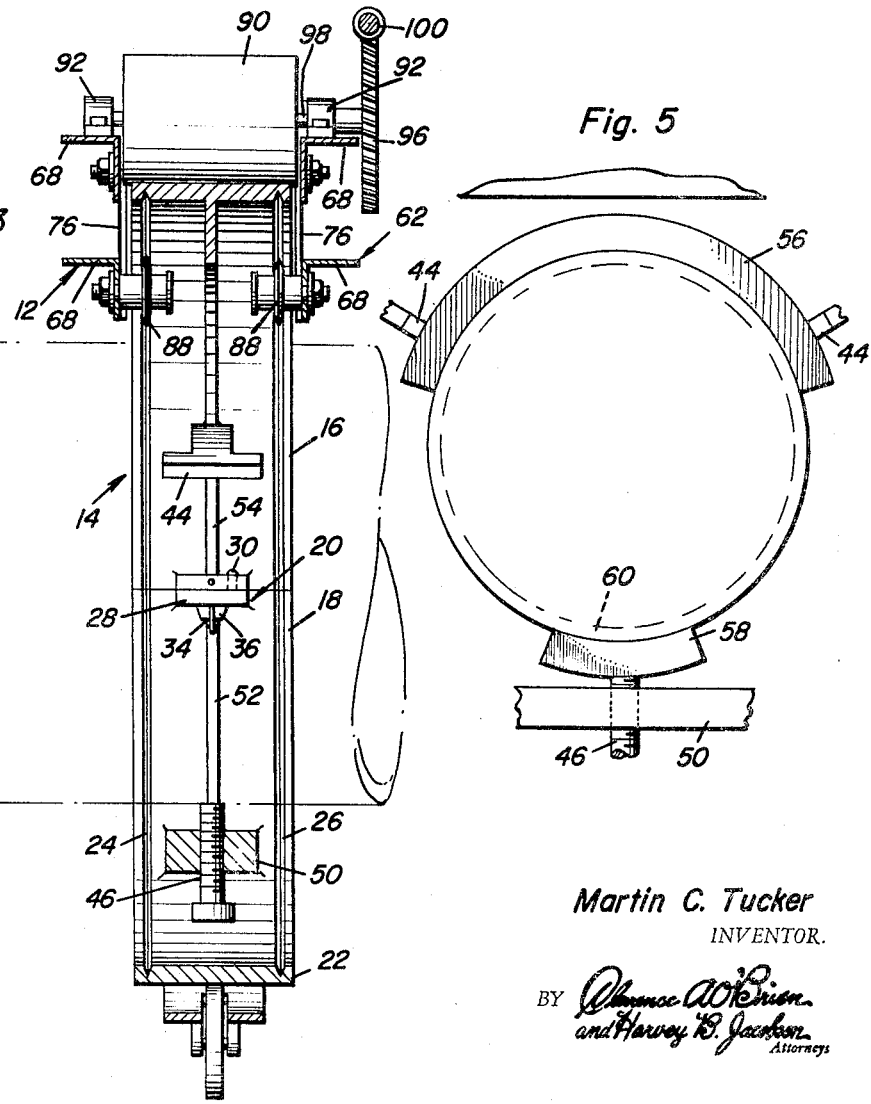
Martin C. Tucker
INVENTOR.

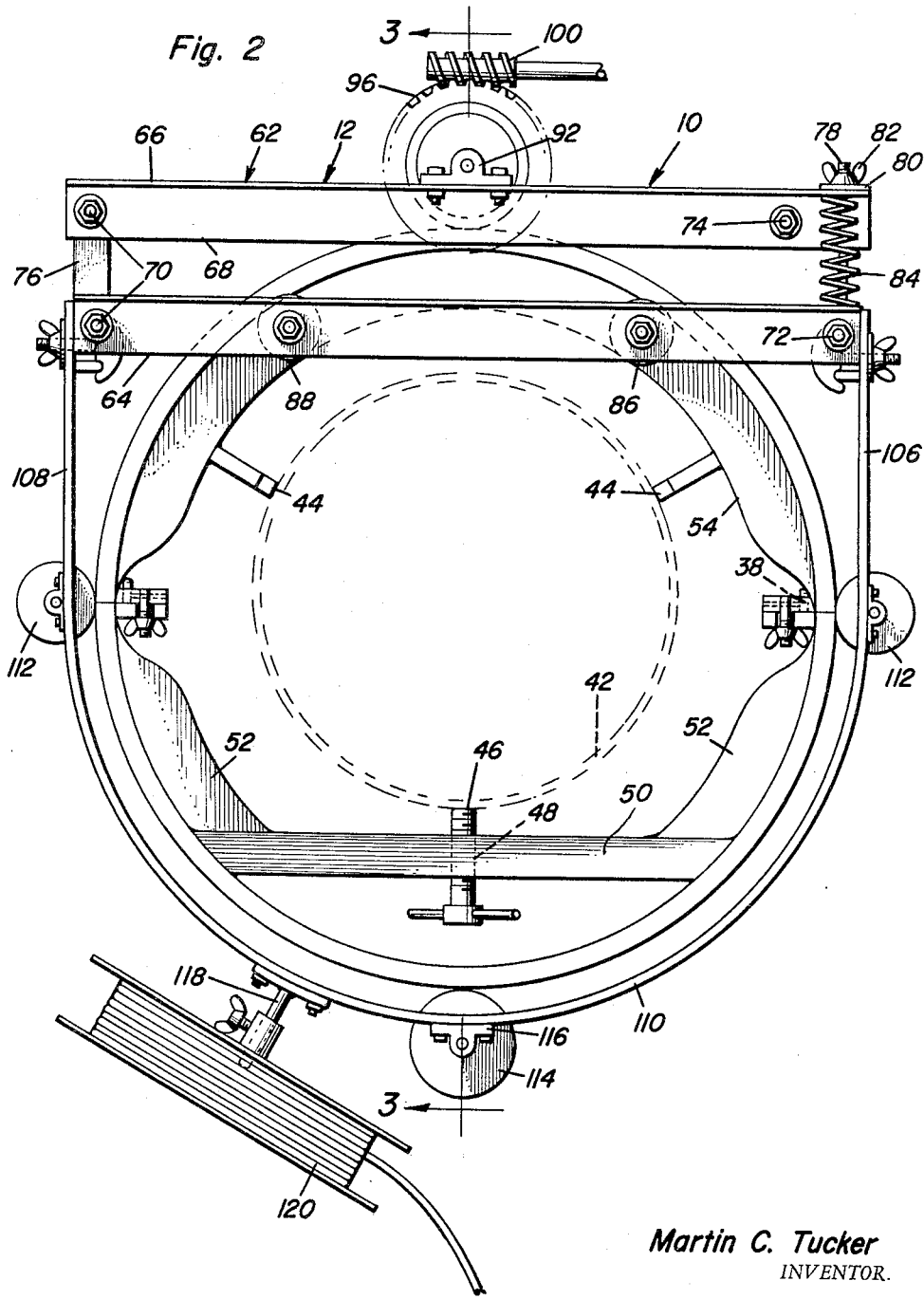

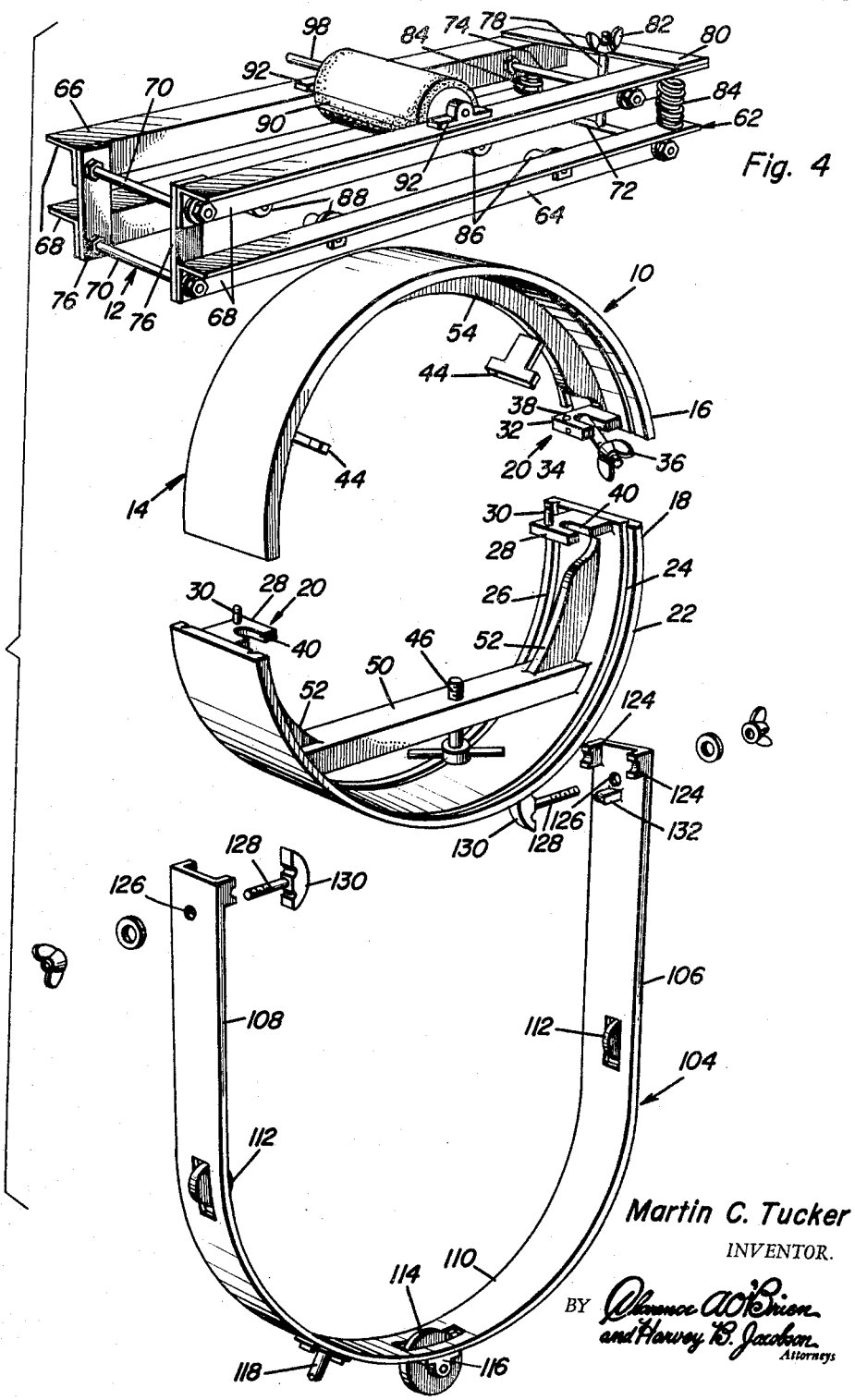

United States Patent Office 3,176,897
Patented Apr. 6, 1965

3,176,897
PIPE WELDING TOOL CARRIAGE
Martin C. Tucker, 207 Hodge St., Moss Point, Miss.
Filed July 24, 1962, Ser. No. 212,033
7 Claims. (Cl. 228—29)

This invention relates to a novel and useful pipe welding tool carriage and more specifically to a tool carriage including a clamp assembly adapted to be fixedly secured to a pipe section and including an elongated frame mounted on the clamp assembly for movement circumferentially about the pipe section to which the clamp assembly is secured. The elongated frame includes an accessory support adapted to support pipe welding or cutting tools as well as rolls of filter wire and the elongated frame of the tool carriage is provided with drive means engaged with the pipe clamp assembly for slowly driving the elongated frame circumferentially about the pipe section to which the clamp assembly is secured.

By slowly moving the elongated frame about the pipe section to which the clamp assembly is secured, the pipe welding and/or cutting tools may be moved at the proper speed relative to the workpiece comprising the pipe section to which the clamp assembly is secured in order that the pipe section may be cut or may have an adjacent pipe section welded thereto.

The main object of this invention is to provide a pipe welding tool carirage which may be secured to pipe sections of various diameters and utilized to slowly move pipe welding or cutting tools circumferentially about that pipe section.

A further object of this invention, in accordance with the preceding object is to provide a pipe clamp assembly whose movable frame is provided with roller means disposed in rolling contacting relation with a cylindrical mounting band defined by the clamp assembly with the roller means of the elongated frame engaging both the inner and outer surfaces of the mounting band and means provided for adjustably positioning the roller means engaged with the outer surfaces of the mounting band relative to the roller means engaged with the inner surfaces of the mounting band in order that the frictional engagement of the roller means with the cylindrical mounting band may be adjusted.

Still another object of this invention is to provide a pipe welding tool carriage in accordance with the preceding objects which includes a tool carirage mounted upon a cylindrical mounting band disposed about the pipe section with which the pipe welding tool carirage is engaged for movement circumferentially about the mounting band and provided with counterbalance means in order that the tendency of the tool carirage will be to move at a constant speed about the mounting band.

A final object to be specifically enumerated herein is to provide a pipe welding tool carriage in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the pipe welding tool carriage of the instant invention;

FIGURE 2 is a side elevational view of the pipe welding tool carriage;

FIGURE 3 is a vertical sectional view taken substantially upon the plane indicated by the section line 3—3 of FIGURE 2;

FIGURE 4 is an exploded perspective view of the pipe welding tool carriage; and

FIGURE 5 is a fragmentary side elevational view similar to that of FIGURE 2 but showing adapter fillers being utilized to enable the pipe welding tool carriage to be secured to a pipe having a different diameter than the pipe illustrated in phantom lines in FIGURE 2 of the drawings.

Referring now more specifically to the drawings, the numeral 10 generally designates the pipe welding tool carriage assembly of the instant invention. The tool carriage assembly may best be viewed from FIGURES 2 and 4 of the drawings and it may be seen that the carriage assembly 10 includes a tool carriage generally referred to by the reference numeral 12 and a pipe clamp assembly generally referred to by the reference numeral 14.

The pipe clamp assembly 14 comprises a pair of half sections 16 and 18 which are secured together by means of suitable positioning and clamp assemblies generally referred to by the reference numeral 20. The pipe clamp assembly 14 defines a cylindrical mounting band 22 which has a pair of axially spaced grooves 24 and 26 formed in its inner surfaces. The cylindrical mounting band 22 is formed of the two half sections 16 and 18. The half section 18 includes a pair of notched flanges 28 each provided with a positioning pin 30. The half section 16 includes a pair of mounting flanges 32 which each has a threaded shank member 34 pivotally secured thereto at one end, a wing nut 36 being threadedly engaged with each of the other ends of the threaded shank members 34. It may be seen from FIGURES 2 and 3 of the drawings that each of the mounting flanges 32 has a bore 38 formed therein for the reception of the free end of the corresponding positioning pin 30. The pivoted shank member 34 may be swung through the open end of the corresponding notch 40 and thereafter the wing nut 36 may be tightened in order to clamp the pipe clamp assembly half sections 16 and 18 about the pipe section 42 with the outer surfaces of the pipe section 42 being engaged by the inner ends of the radially inwardly projecting abutment stands 44 carried by the pipe clamp assembly half section 16 and the innermost end of the threaded adjustment screw 46 which is threadedly engaged in a threaded bore 48 formed through a web 50 lying on a chord of the half section 18.

The half section 18 is reinforced by means of the web 50 and the two webs 52 which extend circumferentially there along and the half section 16 is reinforced by means of a web 54 which is secured between the grooves 24 and 26 and has the outer ends of the abutment stands 44 secured thereto in any convenient manner.

With attention now directed to FIGURE 5 of the drawings, it may be seen that a pair of arcuate adapter plates 56 and 58 may be disposed between a pipe section 60 of smaller diameter than the pipe section 40 and the abutment stands 44 and abutment screw 46. In this manner, pipe sections of varying diameters may be clampingly engaged by the pipe clamp assembly 14.

The tool carriage 12 comprises an elongated frame generally referred to by the reference numeral 62 and includes a pair of inner and outer generally rectangular frames 64 and 66. Each of the frames 64 and 66 comprises a pair of longitudinally extending side angle members 68 which are interconnected at one pair of corresponding ends by means of a pivot shaft 70. The other pair of corresponding ends of the side members 68 of the frame 64 are interconnected by means of a pivot shaft 72 and the corresponding ends of the side members of the frame 66 are interconnected by means of a pivot shaft 74. One pair of corresponding ends of the frames 64 and 66 has a pair of connecting links 76 pivotally secured therebetween and the pivot shaft 72 includes a laterally directed shank portion 78 whose free end projects upwardly through a transverse brace member 80 secured between the corresponding ends of the elongated side members 68 of the upper frame 66. A wing nut 82 is threadedly engaged with the shank portion 78 and thereby establishes a minimum spatial relationship between the adjacent ends of the frames 64 and 66. A pair of compression springs 84 are disposed between corresponding corners of the frames 64 and 66 and normally resiliently urge the corresponding ends of the frames 64 and 66 away from each other and to the maximum spatial relationship defined by the wing nut 82. Each of the side angle members 68 of the lower or inner frame 64 has a pair of rollers 86 and 88 rotatably mounted thereon and the rollers 86 comprise first roller means while the rollers 88 comprise second roller means. The rollers 86 and 88 are engaged or seated in the grooves 24 and 26 formed in the cylindrical mounting band 22 and are guided thereby. A drive roller 90 constructed of yieldable material is rotatably journalled from the side angle members 68 of the upper frame 66 by means of journal blocks 92 and is disposed in rolling contacting relation with the outer surface of the cylindrical mounting band 22. Said drive roll is journalled about an axis generally paralleling the axes of the first and second roller means and disposed between radial planes of said band containing said axes.

From FIGURES 1 and 3 of the drawings it may be seen that a gear wheel 96 may be mounted on the shaft 98 of the roller 90 and have a worm gear 100 meshed therewith. It is to be understood that the worm gear 100 may be driven by any suitable power source such as a flexible cable.

The tool carriage 12 includes a counterbalance and accessory support assembly generally referred to by the reference numeral 104 and the support 104 is defined by a U-shaped member including a pair of legs 106 and 108 interconnected at adjacent ends by means of a curved bight portion 110. Each of the legs 106 and 108 has a roller 112 rotatably supported therefrom and a roller 114 is rotatably supported from the bight portion 110 by means of journal blocks 116. An accessory mounting shank 118 is secured to and projects outwardly from the bight portion 110 and may have a roll of filler wire 120 mounted thereon.

Each of the free ends of the legs 106 and 108 is provided with a pair of notched abutments 124 for seated engagement with the corresponding pivot shaft carried by the frame 64 and is suitably apertured as at 126 for the reception of the shank portion 128 of a bridging head 130. Each of the free ends of the legs 106 and 108 also includes an abutment 132 and one end of each of the bridging heads 130 is engaged with the corresponding abutment 132 while the other end embracingly engages the side of the corresponding support shaft remote from the corresponding notched abutments 124. In this manner, the counterbalance and accessory support 104 is removably secured to the tool carriage 12. It will be noted from FIGURE 2 of the drawings that the rollers 112 and 114 are disposed in rolling contacting relation with the outer surfaces of the cylindrical mounting band defined by the pipe clamp assembly half sections 16 and 18.

Inasmuch as the half sections of the pipe clamp assembly 14 are separably connected to each other, the pipe clamp assembly may be readily secured to an intermediate portion of any length of pipe section. Thereafter, the counterbalance and accessory support 104 may be secured to the tool carriage 12 as hereinbefore set forth. In operation, a pipe welding apparatus or cutting tool as well as the roll of filler wire 120 may be carried by the accessory support or shank 118 while the roller 90 comprising the third roller means is driven in order to move the tool carriage 12 circumferentially about the pipe clamp assembly 14. It is to be noted that the counterbalance and accessory support 104 substantially counterbalances the tool carriage 12 and thus, even when the pipe section to which the pipe welding tool carriage 10 is secured is horizontally disposed, the tool carriage 12 will have a tendency to move about the pipe clamp assembly 14 at a constant speed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, first means defining a generally cylindrical mounting band, clamp means carried by said band and adapted to clampingly mount said band on a pipe of smaller diameter than said band and with the latter generally concentrically disposed about said pipe and spaced therefrom, an elongated tool carriage extending transversely of said band, first roller means carried by one end portion of said carriage and second roller means carried by the opposite end portion of said carriage and journalled for rotation about axes generally paralleling the band axis and disposed in rolling contacting relation with circumferentially spaced portions of the inner surfaces of said band, additional roller means carried by said carriage and journalled for rotation about an axis generally paralleling and disposed between radial planes of said band containing said axes and disposed radially outwardly of the plane in which said axes lie, said additional roller means being adapted to be drivingly connected to a source of motive power and disposed in rolling and driving frictional engagement with the outer surface of said band, and said carriage being adapted to carry a tool for work on the pipe during its movement thereabout.

2. The combination of claim 1 including a carriage counterbalance and accessory support comprising a generally U-shaped member, means on the opposite ends of said elongated carriage for removable securement to the free ends of said U-shaped member with said U-shaped member embracing said clamp means and disposed in overlying relation to the outer surface of said cylindrical mounting band, said U-shaped member including roller means disposed in rolling contacting relation with the outer surface of said cylindrical mounting band.

3. The combination of claim 1 wherein said second roller means comprises a roller constructed of deformable material extending transversely of said elongated carriage and the adjacent portion of the cylindrical mounting band.

4. The combination of claim 1 wherein said clamp means includes means for fixedly and clampingly engaging said pipe clamp assembly to pipe sections of varying diameters.

5. The combination of claim 1 wherein the inner surfaces of said cylindrical mounting band have a pair of axially spaced grooves extending circumferentially thereabout, said first roller means each including a pair of axially-spaced rollers seated in said grooves for guided movement thereby.

6. The combination of claim 1 wherein said clamp means comprises a pair of arcuate half clamp assemblies removably secured together, each of said half clamp assemblies including one-half of said cylindrical mounting band, the opposite ends of said cylindrical mounting band halves being disposed in end abutted relation.

7. The combination of claim 1 wherein said carriage includes means mounting said additional roller means for adjustable lateral shifting of its axis of rotation toward and away from the plane in which the axes of rotation of said first roller means are disposed.

References Cited by the Examiner
UNITED STATES PATENTS

| | | | |
|---|---|---|---|
| 1,266,094 | 5/18 | Beckman | 269—61 |
| 1,389,068 | 8/21 | Olson | 269—289.1 |
| 1,499,499 | 7/24 | Bienenstok | 113—130 |
| 1,872,114 | 8/32 | Burnish | 113—133 |
| 2,269,946 | 1/42 | Lange | 269—287 XR |
| 2,442,833 | 6/48 | Watkins | 113—102 |
| 2,680,420 | 6/54 | Sheffer et al. | 269—58 XR |
| 2,800,867 | 7/57 | Smith | 113—102 |
| 2,820,644 | 1/58 | Smith | 269—287 XR |
| 2,894,111 | 7/59 | McNutt | 219—60.1 |
| 2,906,851 | 9/59 | Kitrell | 219—60.1 |
| 3,042,787 | 7/62 | Kotecki | 219—60.1 |

FOREIGN PATENTS 544,338  2/32  Germany.

CHARLES W. LANHAM, *Primary Examiner.*
JOHN F. CAMPBELL, *Examiner.*